United States Patent Office 3,475,334
Patented Oct. 28, 1969

3,475,334
HYDRAULIC FRACTURING
Joseph R. Boudreaux, Plaquemine, La., assignor to The Dow Chemical Company, Midland, Mich., a corporation of Delaware
No Drawing. Filed Apr. 21, 1966, Ser. No. 544,123
Int. Cl. E21b *41/00;* C09k *3/00*
U.S. Cl. 252—8.55                    3 Claims

ABSTRACT OF THE DISCLOSURE

Subterranean formations are effectively fluid-fractured whereby a saving is realized, both in the amount of fluid necessary and in the amount of energy necessary to inject the fluid, by admixing with an aqueous and/or lower alcohol fluid an amount of a dialdehyde surface-treated cellulose ether in an amount sufficient to lower appreciably the loss of fluid to the formation and to attain fracturing at an appreciably lower injection rate.

---

The invention relates to hydraulic fracturing of fluid-bearing subterranean formations, penetrated by a wellbore for the purpose of creating flow channels therein and thereby stimulating production of said fluid from the formation. It is known that the injection of a fluid down a well penetrating a formation, at sufficient pressure to overcome the pressure exerted by the overburden, results in fractures in the formation. Hydraulic fracturing usually includes suspending in the fracturing fluid substantially insoluble solid particles which are deposited in the fractures as they are created, thereby to provide more-or-less lasting channels for passageways through which fluid, desired to be produced from the formation, may flow toward the wellbore with greater ease and in greater quantity. It is also known that effective fracturing operations, which by nature are usually carried out in a more-or-less porous formation, generally require, in the fracturing fluid, the presence of an agent which is capable of lessening the loss of the fluid through the pores of the formation which is being fractured. This agent is known as a fluid loss control agent. Its presence, by preventing excessive loss of fluid into the formation, assists in building up fracturing pressures more quickly and economically and results in a more extensive fracture pattern.

A number of such agents are known. Their performance for the desired purpose varies widely under various fracturing conditions. Such conditions include the type of fluid employed, the nature of the formation being fractured, and to some extent, the characteristics of the fluid in the formation with which the agent comes in contact. The need for a highly effective fluid loss control agent useful under a relatively large number of conditions exists. New and better fluid loss control agents are continuously being sought.

It has recently been discovered that better fracturing jobs can be performed at greater efficiency by providing more nearly laminar flow in the fluid being injected as opposed to a more turbulent flow which is characterized by eddies and lack of a uniform forward movement of the fluid being injected which increases pumping cost and prevents the high rates of injection often desired.

The invention provides a novel fracturing fluid and a method of fracturing porous subterranean formations employing a novel fluid (1) wherein laminar flow is maintained at heretofore impractically high pumping rates, and (2) wherein fluid loss to the formation is markedly lessened. The fracturing fluid of the invention comprises an aqueous or alcoholic base liquid, e.g., water, acid, brine, or a lower alkyl alcohol, or mixture thereof containing in admixture therewith a particulated cellulose ether which has been surface treated by reacting it with a dialdehyde, and thereafter preferably subjected to the action of an alkali metal or ammonium salt of a weak acid. The preferred dialdehyde to employ to treat the cellulose ether for use in the practice of the invention is glyoxal. The composition employed in the practice of the invention may, optionally, contain other known fluid-loss additives, e.g., silica flour. It may (although it is unnecessary for the practice of the invention) contain other additives employed for their known properties.

Fracturing subterranean formations using the improved fracturing fluid may be conducted employing standardized pumping equipment and procedures. The dialdehyde surface treated cellulose ether, preferably subsequently admixed with an alkali metal or ammonium salt of a weak acid, may be premixed with the aqueous fracturing liquid or each of the ether and fluid may be injected substantially simultaneously into the well and mixing effectuated in the pipe. Fracturing operations according to the invention are characterized by low fluid loss and less turbulence (and accordingly less friction loss) during injection which result in lowering pumping costs, higher rates of injection, and a more extensive fracturing pattern in a shorter treating period.

Illustrative of the cellulose ethers to employ for reaction with the selected dialdehyde are methyl cellulose, methyl ethyl cellulose, methyl hydroxypropyl cellulose, hydroxyethyl cellulose, hydroxypropyl cellulose, carboxymethyl cellulose, carboxymethyl methyl cellulose, and carboxymethyl methyl hydroxyethyl cellulose. The cellulose ether to be surface treated for use in the practice of the invention may be prepared according to one of a number of known procedures as described in the literature, e.g., High Polymers, vol. 5, part II by Ott and Spurlin, pages 882 to 958, Interscience Publishers. One method consists broadly, in general, of reacting a cellulose source, e.g., wet pulp or cotton linters with an aqueous NaOH solution and subsequently reacting the so-treated linters with a selected alkylating agent, e.g., methylene chloride or ethylene chloride. The cellulose ether so prepared is thereafter subjected to the dialdehydic surface treatment, e.g., in accordance with the method described in U.S. Patent 2,879,268 or in 3,072,635. This diadehyde cellulose ether so prepared is then preferably mixed with an alkali metal or ammonium salt of a weakly ionized acid (i.e., of a weak protonic acid) as described in S.N. 348,023, filed February 28, 1964 which issued as Patent 3,356,519.

Examples of such salts are the potassium or sodium salts of acids having an ionization constant of between about $1 \times 10^{-3}$ and $1 \times 10^{-10}$. The hydrated form of such salts are sometimes preferred. For the identity of such acids, reference may be made to any standard handbook of chemistry, e.g., pp. 1404 to 1406 of Handbook of Chemistry, 7th ed. Handbook Publishers, Inc. Among such are carbonic, boric, phosphoric, acetic, citric, tartaric, uric, valeric and silicic. A sufficient amount of such salt or mixture thereof is employed according to S.N. 348,023, to insure a pH value in water of between about 7.5 and about 9.5. The recommended procedure is to apply the aqueous salt solution to the dry particulate dialdehyde-treated cellulose ether, spraying being a convenient technique to employ.

Dialdehydes suitable for use are glyoxal, pyruvaldehyde, malonaldehyde, succinaldehyde, and adipaldehyde.

Broadly, the present invention is practiced by preparing the dialdehyde-modified cellulose ether, preferably dryblending the ether so prepared with an alkali metal or ammonium salt of a weak acid (according to S.N. 348,023) and admixing the so-treated dialdehyde-modified cellulose ether with an aqueous or alcohol base liquid suitable for fracturing subterranean formations, employing an effective amount, usually between about 0.0005 and 0.5 pound of the ether per gallon of the fracturing liquid, and injecting the so-prepared liquid into a well at pressures sufficient to fracture the formation. Usually not over about 0.2 pound of the ether per 1,000 gallons of liquid is used.

The following examples are illustrative of the practice of the invention.

COMPARATIVE TEST A

Crude cotton linters were treated with an aqueous solution of NaOH in a ribbon blender reactor and subsequently alkylated to produce cellulose ether. The cellulose ether so prepared contained some of each of carboxymethyl, methyl, and hydroxymethyl groups. For purposes of comparison, the following test was run which is not in accordance with the invention but is considered outstanding among the known methods of providing a low fluid loss liquid for use in fracturing.

Fifty pounds of the material so produced, without further treatment, were admixed with 16 pounds of finely pulverized silica dispersed in 1,000 gallons of water. The fluid-loss properties of the resulting liquid were then determined according to API RP 39, Section V. An initial spurt loss of 11 milliliters occurred. The test was carried out for 30 minutes during which there was a total fluid loss of 26 milliliters in 30 minutes (including the initial spurt loss).

EXAMPLE 1

To demonstrate the practice of the invention the cellulose ether, as initially prepared above, was first subjected to the cross-linking surface action of a prepared composition consisting essentially of glyoxal in a 40% aqueous solution and polyoxyethylene glycol having a molecular weight of about 1200 in weight proportions to provide about 0.3 ether to 1.0 glycol. The glyoxal-glycol solution was applied by spraying it through an atomizer nozzle onto the cellulose ether in a ribbon blender reactor. The treatment was continued until 0.3% by weight of glyoxal and, accordingly, 1.0% by weight of the polyglycol, based on the weight of the cellulose ether were applied. Thereafter, the material was mixed with solid $Na_3B_4O_7 \cdot 10H_2O$. The resulting so-treated cellulose ether was admixed with water in the proportions employed above, viz. fifty pounds of the fluid loss additive per 1,000 gallons of water. The resulting composition was tested for its fluid loss properties as above.

The intial spurt loss was 8 milliliters and the total fluid loss in 30 minutes was 18 milliliters (including the initial spurt loss). It is seen that a significant lessening of loss of fluid results when the fluid loss additive employed is that required by the method of the invention.

EXAMPLE 2

The example of the invention above was repeated except that the cellulose ether employed consisted substantially of only the hydroxyethyl with but a minor number (about an average of 0.3 group per anhydro-gluco unit) of carboxymethyl groups. The ether was reacted with the glyoxal-glycol mixture employed above and subsequently admixed with $Na_3B_4O_7 \cdot 10H_2O$. The fluid loss was again determined as in the above example showing an initial spurt loss of 2 milliliters and a total loss of 15 milliliters in 30 minutes (including the initial spurt). These results are highly satisfactory for an acceptable fracturing fluid.

EXAMPLE 3

This example illustrates a field treatment in accordance with the practice of the invention. The composition of Example 1 above is prepared (designated hereafter as Composition F) and admixed with a 3% by weight aqueous HCl solution in proportions of about 75 pounds of Composition F per 1,000 gallons of the acid solution. 12,000 gallons of the composition so prepared are then injected down a well penetrating an oil-bearing stratum desired to be treated (e.g., in Bokoshe Field, Okla.) while blending 20 to 40 mesh size propping sand therewith, in proportions of about 1.5 pounds of sand per gallon of liquid, at an injection pressure sufficient to fracture the stratum. Repeated injections to attain additional fractures may be made. Fracturing pressures are readily attained due to the fluid loss inhibition effectuated by the presence of the treated cellulose ether. Following fracturing, pressure on the liquid at the wellhead is released and the well swabbed (residual fracturing fluid removed from the well). Improved oil production from the stratum results.

It is understood that the above example is illustrative only and that the presence of the acid and the propping sand is optional. Similarly, the ratio of components and the qualities will vary with conditions and needs as determined by those skilled in the art.

The practice of the invention indicates a number of beneficial effects, among which are: reduced loss of fluid to the formation; improved suspending properties for the propping agent, e.g., 10 to 40 mesh sand; and reduced friction between the injected fluid and the confining walls of the pipes and channels thereby lessening the energy necessary to fracture the formation.

Having described the invention, what I claim and desire to be protected by Letters Patent is:

1. The method of fracturing a subterranean porous formation penetrated by a wellbore employing a fracturing fluid wherein both the loss of fracturing fluid into the formation and the amount of energy, required to be applied to the fracturing fluid at ground level which is necessary to attain fracturing, are lessened, which comprises (1) reacting a cellulose ether selected from the class consisting of methyl cellulose, methyl ethyl cellulose, methyl hydroxypropyl cellulose, carboxyethyl cellulose, hydroxypropyl cellulose, carboxymethyl cellulose, carboxymethyl methyl cellulose, and carboxymethyl methyl hydroxyethyl cellulose, with a dialdehyde selected from the class consisting of glyoxal, pyruvaldehyde, malonaldehyde, succinaldehyde, and adipaldehyde, and subsequently subjecting the aldehyde-treated cellulose ether to the action of a basic pH buffering agent selected from the class consisting of alkali metal and ammonium salts of a weak acid having an ionization constant of between about $1 \times 10^{-3}$ and $1 \times 10^{-10}$ in an amount sufficient to provide a pH value of between about 7.5 and about 9.5, (2) admixing between about 0.0005 and about 0.5 pound of the so treated cellulose ether per gallon of a liquid selected from the class consisting of water, aqueous acids, brines, water-miscible lower alkyl alcohols, and mixtures of lower alkyl alcohols and water; and (3) injecting the liquid containing the so treated cellulose ether down the well and forcing it back into the formation at a pressure sufficient to fracture the formation.

2. The method according to claim 1, wherein the dialdehyde is glyoxal.

3. The method according to claim 1, wherein the liquid is a 1% to 25% by weight aqueous solution of HCl.

References Cited

UNITED STATES PATENTS

| | | | |
|---|---|---|---|
| 2,689,230 | 9/1954 | Cardwell et al. | 252—8.55 |
| 2,879,268 | 3/1959 | Jullander | 260—232 |
| 3,072,635 | 1/1963 | Menkart et al. | 260—232 |
| 3,281,354 | 10/1966 | Scott et al. | 252—8.55 |
| 3,319,716 | 5/1967 | Dill | 166—42 |
| 3,356,519 | 12/1967 | Chambers et al. | 106—187 |

HERBERT B. GUYNN, Primary Examiner

U.S. Cl. X.R.

166—308